(12) United States Patent
Pedapudi et al.

(10) Patent No.: US 10,372,760 B2
(45) Date of Patent: Aug. 6, 2019

(54) BUILDING QUERIES DIRECTED TO OBJECTS HOSTED ON CLOUDS

(71) Applicant: Oracle International Corporation, Redwood Shores, CA (US)

(72) Inventors: Narayana Murthy Pedapudi, Hyderabad (IN); Kurien Kurien Kannukuzhiyil, Bangalore (IN); Anuj Kaushal, Noida (IN)

(73) Assignee: Oracle International Corporation, Redwood Shores, CA (US)

( * ) Notice: Subject to any disclaimer, the term of this patent is extended or adjusted under 35 U.S.C. 154(b) by 623 days.

(21) Appl. No.: 14/687,956

(22) Filed: Apr. 16, 2015

(65) Prior Publication Data
US 2016/0092455 A1 Mar. 31, 2016

Related U.S. Application Data

(60) Provisional application No. 62/055,666, filed on Sep. 26, 2014.

(51) Int. Cl.
*G06F 16/832* (2019.01)
(52) U.S. Cl.
CPC .................. *G06F 16/832* (2019.01)
(58) Field of Classification Search
None
See application file for complete search history.

(56) References Cited

U.S. PATENT DOCUMENTS

| | | | |
|---|---|---|---|
| 6,353,830 B1 | 3/2002 | Yee et al. | |
| 8,429,601 B2 | 4/2013 | Andersen | |
| 2006/0195425 A1 | 8/2006 | Deem et al. | |
| 2010/0114932 A1* | 5/2010 | Whitcher | G06F 17/30427 |
| | | | 707/760 |

(Continued)

FOREIGN PATENT DOCUMENTS

EP 2728494 A1 5/2014

OTHER PUBLICATIONS

Active Query Builder Delphi VCL Edition, http://active-query-builder-delphi-vcl-edition.softwareknow.com/, downloaded circa Aug. 21, 2014, pp. 1-3.

(Continued)

*Primary Examiner* — Ashish Thomas
*Assistant Examiner* — Dustin D Eyers
(74) *Attorney, Agent, or Firm* — IPHORIZONS PLLC; Narendra Reddy Thappeta

(57) ABSTRACT

According to an aspect of the present disclosure, a query builder sends to a node in a cloud, a request for meta-data related to objects, and in response receives from the node, the meta-data specifying information related to objects exposed by the node. Upon receiving from a user a partial query and a current edit location during building of a corresponding complete query, the query builder determines, based on the received meta-data, the current edit location, and the partial query, a list of identifiers which are potential candidates for insertion at the current edit location. The query builder then displays the list of identifiers to the user, and receives a selection of an identifier from the displayed list. The query builder incorporates the selected identifier in the partial query at the current edit location to form a further developed query.

20 Claims, 15 Drawing Sheets

(56) References Cited

U.S. PATENT DOCUMENTS

| | | | | |
|---|---|---|---|---|
| 2010/0281364 | A1* | 11/2010 | Sidman | G06F 17/30595 |
| | | | | 715/713 |
| 2010/0293524 | A1 | 11/2010 | Ahadian et al. | |
| 2011/0103393 | A1* | 5/2011 | Meier | H04L 12/66 |
| | | | | 370/401 |
| 2011/0276588 | A1 | 11/2011 | Moon et al. | |
| 2012/0233186 | A1* | 9/2012 | Hammer | G06Q 10/06 |
| | | | | 707/755 |
| 2012/0330991 | A1* | 12/2012 | Babka | G06F 17/30017 |
| | | | | 707/765 |
| 2013/0151884 | A1* | 6/2013 | Hsu | G06F 17/302 |
| | | | | 714/4.11 |
| 2013/0275457 | A1* | 10/2013 | Lee | G06F 17/30545 |
| | | | | 707/769 |
| 2015/0019589 | A1* | 1/2015 | Arroyo | G06F 17/30424 |
| | | | | 707/779 |
| 2015/0278397 | A1* | 10/2015 | Hendrickson | G06F 17/30958 |
| | | | | 707/798 |

OTHER PUBLICATIONS

Active Query Builder VCL Free Edition v.1.7.9, http://www.winsite.com/Development/Components-Libraries/Active-Query-Builder-VCL-Free-Edition/, downloaded circa Aug. 21, 2014, pp. 1-3.

Alteryx Choose Table or Specify Query, http://downloads.alteryx.com/Alteryx9.0/WebHelp, ChooseTableorSpecifyQuery.htm, downloaded circa Aug. 22, 2014, pp. 1-2.

Building SQL Queries with Query Builder, http://docs.oracle.com/cd/E51994_01/hcm92pbr4/eng/hcm/hhaf/task_BuildingSQLQuerieswithQueryBuilder-e325b3.html, downloaded circa Aug. 22, 2014, pp. 1-10.

MX Query Builder features, http://www.interaktonline.info/documentation/MX_Kollection_3_00/029900_QueryBuilderFeature.htm, downloaded circa Aug. 22, 2014, pp. 1-6.

SQL Server 2014 Parameter Info (IntelliSense), http://msdn.microsoft.com/en-us/library/ms173510.aspx, downloaded circa Aug. 22, 2014, pp. 1-1.

Sybase SQL Editor, http://razorsql.com/features/sybase_editor.html, downloaded circa Aug. 22, 2014, pp. 1-2.

* cited by examiner

FIG. 3B

```xml
<n0:MetaDataClass>
  <n1:Attributes>
    <n1:MetaDataAttributeList>
      <n1:DataType>ID</n1:DataType>
      <n1:IsDeprecated>false</n1:IsDeprecated>
      <n1:Description>Primary key identifier</n1:Description>
      <n1:MinValue>1</n1:MinValue>
      <n1:Name>ID</n1:Name>
      <n1:Nullable>false</n1:Nullable>
      <n1:UsageOnCreate>NOT_ALLOWED</n1:UsageOnCreate>
    </n1:MetaDataAttributeList>
    ...
  </n1:Attributes>                                                              — 340
  <n1:CanCreate>true</n1:CanCreate> <n1:CanDestroy>true</n1:CanDestroy>
  <n1:CanGet>true</n1:CanGet> <n1:CanUpdate>true</n1:CanUpdate>
  <n1:DerivedFrom>
    <n2:Namespace>urn:base.ws.rightnow.com/v1_2</n2:Namespace><n2:TypeName>RNObject</n2:TypeName>
  </n1:DerivedFrom>
  <n1:MetaDataLink>Account</n1:MetaDataLink>
  <n1:Name>
    <n2:Namespace>urn:objects.ws.rightnow.com/v1_2</n2:Namespace><n2:TypeName>Account</n2:TypeName>
  </n1:Name>                                                                    — 350
  <n1:Relationships>
    <n1:MyCardinality>ONE</n1:MyCardinality>
    <n1:MyKeyAttributes>ID</n1:MyKeyAttributes>
    <n1:MyKeyType>PRIMARY</n1:MyKeyType>
    <n1:Name>CO$Product_Registration$CreatedByAccount</n1:Name>
    <n1:Navigability>INCOMING</n1:Navigability>
    <n1:OtherClassCardinality>ZERO_OR_MORE</n1:OtherClassCardinality>
    <n1:OtherClassKeyAttributes>CreatedByAccount</n1:OtherClassKeyAttributes>
    <n1:OtherClassKeyType>FOREIGN_RELATION</n1:OtherClassKeyType>
    <n1:OtherClassName>
      <n2:Namespace>CO</n2:Namespace> <n2:TypeName>Product_Registration</n2:TypeName>
    </n1:OtherClassName>
  </n1:Relationships>                                                           — 360
  ...
</n0:MetaDataClass>
```

330

BUILDING QUERIES DIRECTED TO OBJECTS HOSTED ON CLOUDS

PRIORITY CLAIM

The instant patent application claims priority from U.S. Provisional patent application entitled, "BUILDING QUERIES DIRECTED TO OBJECTS HOSTED ON CLOUDS", Ser. No. 62/055,666, Filed: 26 Sep. 2014, which is incorporated in its entirety herewith to the extent not inconsistent with the disclosure herein.

BACKGROUND

Technical Field

The present disclosure relates to cloud computing, more specifically to building queries directed to objects hosted on clouds.

Related Art

A cloud refers to a highly scalable computing infrastructure, in which customers avail virtualized resources, as corresponding services over networks. The infrastructure typically contains computing, storage, and communication resources, which are dynamically shared among different applications of various customers. Application instances are typically deployed on shared computing resources, while the data used by the instances is stored on the shared storage resources.

Data stored in clouds is commonly exposed as objects. As is well known in the relevant arts, objects represent any entities of interest. Each object typically has attributes, with the value of each attribute expressing a characteristic of the corresponding entity. Exposing data as an object implies that interfaces are provided by a computing or storage resource to external programs such that the data can be manipulated as objects by the external programs.

Queries are often directed to objects hosted on clouds consistent with the corresponding interfaces. Such queries are in the form of object query language (OQL), implying that the query specifies objects and the corresponding attributes. Users may be required to build such queries.

Aspects of the present disclosure simplify building of queries directed to objects hosted on clouds.

BRIEF DESCRIPTION OF THE DRAWINGS

Example embodiments of the present disclosure will be described with reference to the accompanying drawings briefly described below.

FIG. 3B depicts portions of meta-data obtained from a node in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present disclosure, a query builder facilitates the building of queries directed to objects hosted on a cloud. In one embodiment, the query builder sends to a node in the cloud, a request for meta-data related to objects, and in response receives from the node, the meta-data specifying information related to objects exposed by the node. Upon receiving from a user a partial query and a current edit location during building of a corresponding complete query, the query builder determines, based on the received meta-data, the current edit location, and the partial query, a list of identifiers which are potential candidates for insertion at the current edit location. The query builder then displays the list of identifiers to the user, and receives a selection of an identifier from the displayed list. The query builder incorporates the selected identifier in the partial query at the current edit location to form a further developed query.

It may be appreciated that the steps of receiving the partial query, the determination of the identifiers, the display of the identifiers, the selection of an identifier and the incorporation of the identifier may be performed in a sequence of iterations, with the further developed query of a current iteration being used as the partial query for a next iteration until the corresponding complete query is formed.

In one embodiment, each of the identifiers is one of an identifier of an object, an identifier of an attribute of an object, and an identifier of a relationship of an object. Also, the corresponding complete query (formed after multiple iterations) is according to Object Query Language (OQL).

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
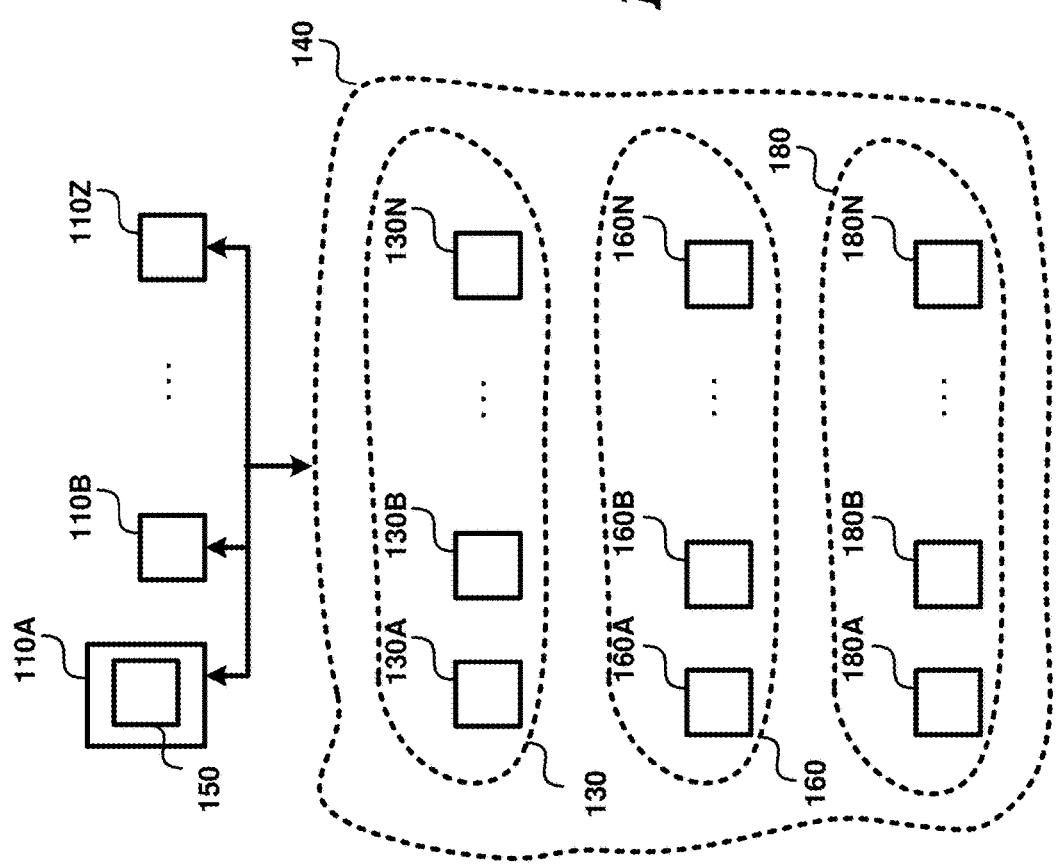
FIG. 1 is a block diagram illustrating an example environment (computing system) in which several aspects of the present disclosure can be implemented.

FIG. 1 is a block diagram illustrating an example environment (computing system) in which several aspects of the present disclosure can be implemented. The block diagram is shown containing client systems 110A-110Z, cloud 140 and query builder 150 (shown executing in client system 110A). Cloud 140 in turn is shown containing grids 130, 160 and 180, respectively containing nodes 130A-130N, 160A-160N and 180A-180N.

Merely for illustration, only representative number/type of systems is shown in FIG. 1. Many environments often contain many more grids/systems/nodes, both in number and type, depending on the purpose for which the environment is designed. Each system/node of FIG. 1 is described below in further detail.

Each of client systems 110A-110Z represents a system such as a personal computer, workstation, mobile station, mobile phone, computing tablet, etc., used by users to generate client requests directed to enterprise applications hosted in cloud 140. The requests may be generated using appropriate user interfaces (e.g., web pages provided by an application hosted in cloud 140, a native user interface provided by a local application downloaded from cloud 140, etc.). In general, a client system sends requests for performing desired tasks to an enterprise application, and receives corresponding responses containing the results of performance of the requested tasks.

Cloud 140 is used to host enterprise applications capable of processing client requests received from client systems 110A-110Z and to send corresponding responses. The nodes shown contained within cloud 140 can communicate with each other over a network (not shown) such as Internet, and may be configured or organized to form one or more (smaller) grids. Different grids (130/160/180) in cloud 140 provide different resources as corresponding services, with the underlying physical computing elements not exposed directly, but abstracted at various levels.

For example, grid 130 (nodes 130A-130N) may represent a grid/cloud providing resources at higher levels of abstraction such as a software, platform/stack, application server/interface, etc. Grid 160 (nodes 160A-160N) may represent a grid providing resources at lower levels of abstraction such as database, storage, virtual machine, operating system, hardware, etc. Grid 180 (nodes 180A-180N) may represent a grid/cloud providing a set of hardware and/or software infrastructure elements (such as servers, virtual machines, memory, CPU, disk space, data center facilities, operating systems, etc.)

The different resources are typically provided as corresponding services such as hardware/virtual machines as a service, storage as a service, database as a service (DaaS), platform as a service (PaaS), software as a service (SaaS), infrastructure as a service (IaaS), etc., such that a client (in general, any user external to the cloud) accessing a service provided by a grid is generally not made aware of which of the specific nodes in the grid processes the service/client request. Different resources required for hosting an enterprise application may be provisioned by selecting the appropriate services.

It may be appreciated that at least some of the nodes in cloud 140 may store data that is exposed to external programs (such as an enterprise application executing in one of client systems 110A-110Z). For example, a computing resource/node may expose configuration data that controls the operation of application instances (of the enterprise application) executing in the computing node. Alternatively, a storage resource/node may expose some of the data maintained in the node. In one embodiment, the nodes provide interfaces that enable the external programs to manipulate the data as corresponding objects.

There are several challenges to building queries directed to such objects (hosted on cloud 140). For example, a user (such as a developer or an administrator) may be required to determine the pre-defined ("standard") objects that can be queried in the cloud, the relationships associated with the objects, any custom objects specific to each node and to identify the attributes of the standard and/or custom objects. The user may also be required to know the syntax (such as the keywords, the functions, etc.) and the validating semantics of each query type to enable the user to build proper/correct queries.

Query builder 150 provided according to several aspects of the present disclosure, facilitates the building of queries directed to objects hosted on clouds (such as 140) while overcoming some of the above noted challenges. Though shown executing in client system 110A, it should be appreciated that query builder 150 may be executing in any one of the other client systems 110B-110Z, as will be apparent to one skilled in the relevant arts by reading the disclosure herein. The manner in which query builder 150 facilitates building of queries directed to objects hosted on cloud 140 is described below with examples.

3. Building Queries Directed to Objects Hosted on a Cloud

Figure 2:
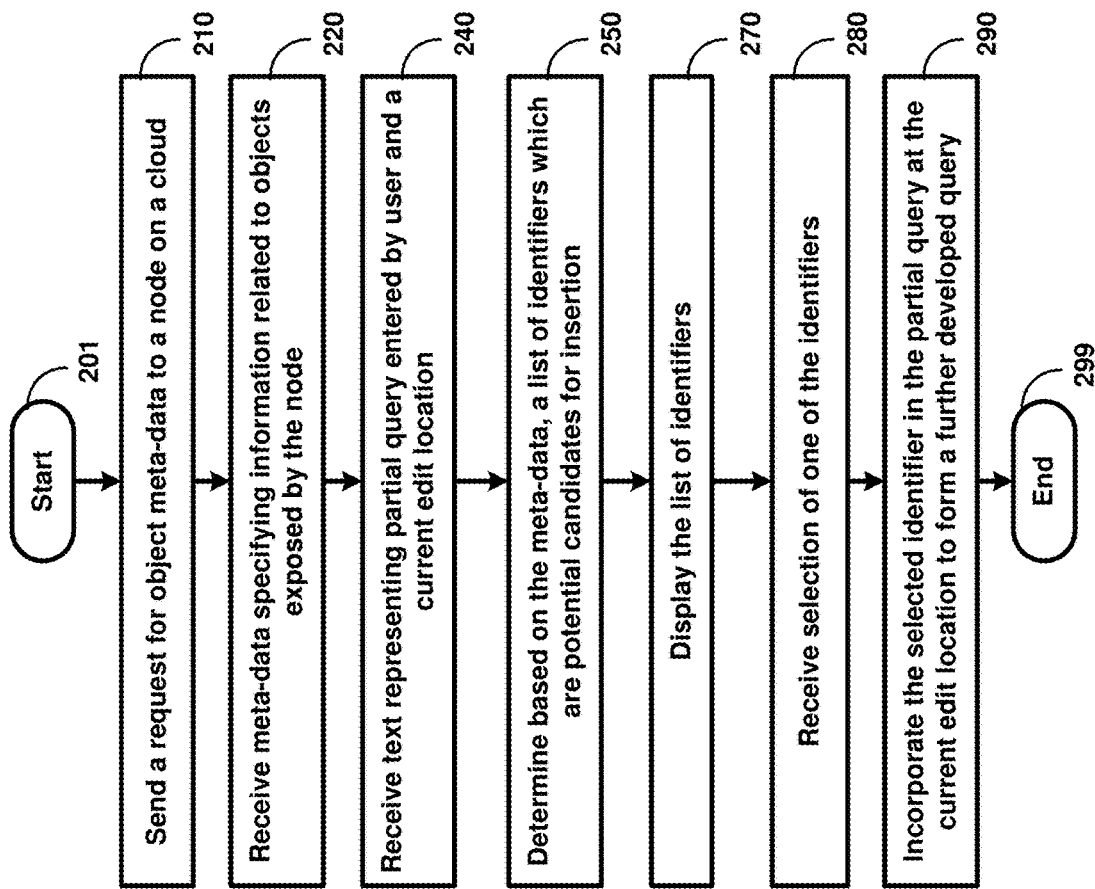
FIG. 2 is a flow chart illustrating the manner in which the building of queries directed to objects hosted on a cloud (140) is facilitated according to an aspect of the present disclosure.

FIG. 2 is a flow chart illustrating the manner in which the building of queries directed to objects hosted on a cloud (140) is facilitated according to an aspect of the present disclosure. The flowchart is described with respect to FIG. 1, in particular, query builder 150, merely for illustration. However, many of the features can be implemented in other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, query builder 150 sends a request for object meta-data to a node (for example, 130B) on a cloud (140). The meta-data is designed to identify the objects, in addition to specifying the various attributes and relationships among the objects. The request may be sent as an IP packet directed to the node via a network (not shown).

In step 220, query builder 150 receives specific meta-data specifying information related to objects exposed by the node. In an embodiment, the node is designed to send the meta-data related to all the objects exposed by the node. Accordingly, the received meta-data may contain the above noted information related to all the objects exposed by the node. The node may also be designed to send the meta-data related to only the custom objects exposed by the node.

In step 240, query builder 150 receives text representing partial query entered by a user and a current edit location. The partial query is represented in the form of a sequence of characters so far entered by the user. The term partial implies that the query under development is typically incomplete, though it may represent situations in which a complete query can be further developed. A current edit location specifies the point at which a new/next character entered by the user would be inserted in the partial query. Such location is typically represented by the text cursor in the corresponding user interfaces.

In step 250, query builder 150 determines, based on the specific meta-data received in step 220, the current edit location and the partial query, a list of identifiers which are potential candidates for insertion at the current edit location. Implementation of such determination normally entails an understanding of the syntax of various query types so as to identify the applicable one(s) of the syntax to the received partial query. Factoring in the current edit location to such applicable syntax narrows down the potential candidates/identifiers that could be incorporated at the edit location. In some scenarios, the portions of the partial query prior to the edit location would be required to be examined to determine the identifiers.

In step 270, query builder 150 displays the list of identifiers determined in step 250. Any suitable interface can be used for such display. In an embodiment, the list is displayed as a pop-up menu at the current edit location.

In step 280, query builder 150 receives selection of one of the identifiers (for example, user selecting one of the identifiers from the pop-up menu noted above). In step 290, query builder 150 incorporates the selected identifier in the partial query at the current edit location to form a further developed query. The flow chart ends in step 299.

It may be appreciated that the steps of 240 through 290 may be performed in an iterative manner, with the further developed query of an iteration being the partial query for the next iteration, until the user builds a complete query. The complete query may thereafter be executed on the node (130B) from which the meta-data was obtained.

The manner in which query builder 150 may facilitate the building of queries according to FIG. 2 is illustrated below with examples.

4. Illustrative Example

FIGS. 3A-3B, 4, 5A-5G and 6A-6B together illustrate the manner in which building of queries directed to objects hosted on clouds is facilitated in one embodiment. In the following description it is assumed that cloud 140 is implemented using Oracle Service Cloud (also known as RightNow) CX platform available from Oracle Corporation, and accordingly the nodes in cloud 140 enables users/customers to execute queries against objects stored in cloud 140 using the RightNow Object Query Language (ROQL, pronounced "Rockwell"). ROQL is based on a subset of Object Query Language (OQL) and a SQL-like query language that has been extended to handle object notation. Each of the Figures is described in detail below.

Figure 3A:
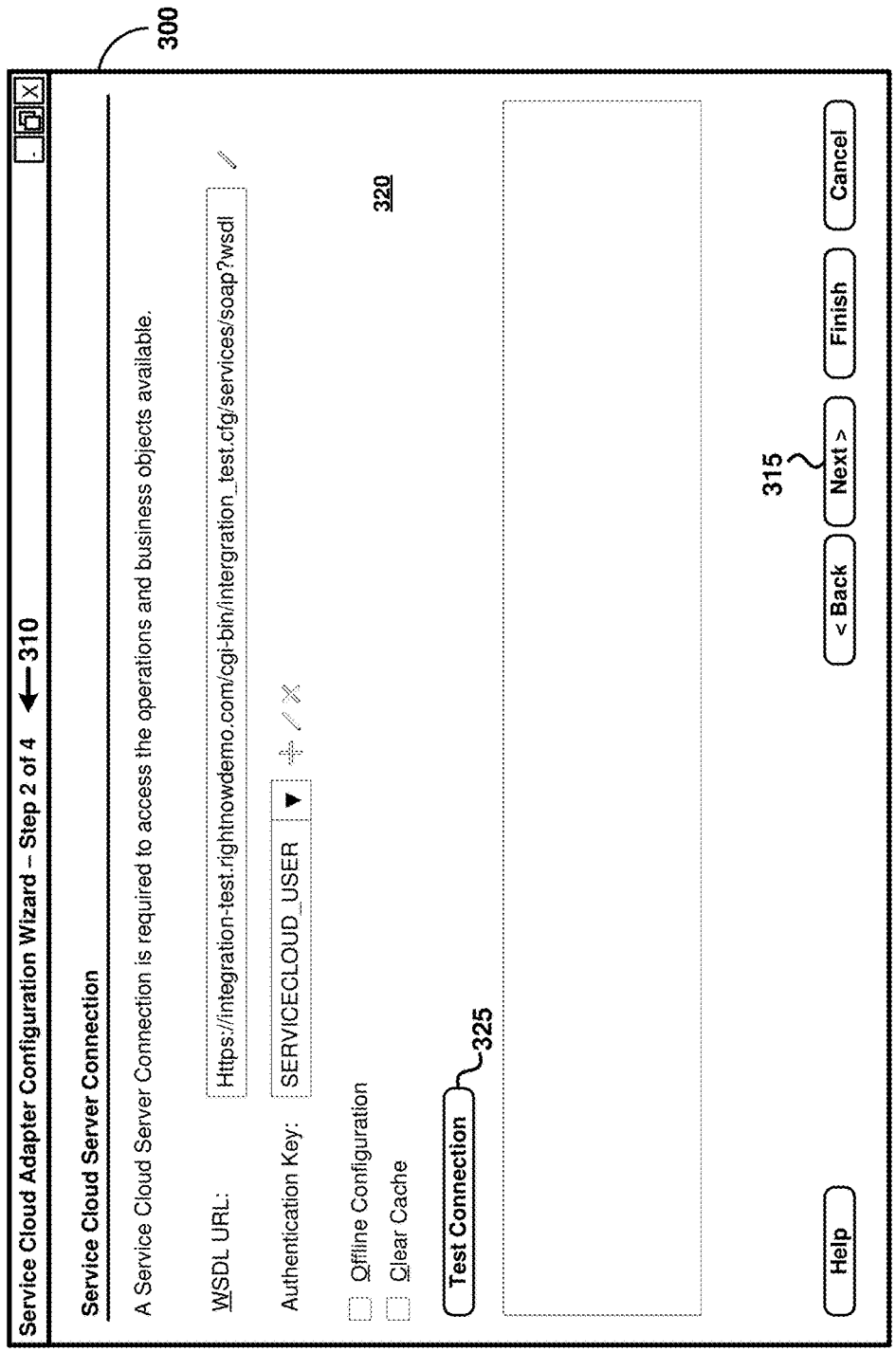
FIG. 3A depicts the manner in which meta-data related to objects exposed by a node is obtained in one embodiment.

FIG. 3A depicts the manner in which meta-data related to objects exposed by a node is obtained in one embodiment. Display area 300 (and also 500 of FIGS. 5A-5G and 600 of FIGS. 6A-6B) depicts a respective portion of a user interface provided on a display unit (not shown in FIG. 1) associated with client system 110A. Each of the user interfaces is provided by query builder 150 executing in client system 110A. In an embodiment, query builder 150 corresponds to an application named "Service Cloud Adapter Configuration Wizard". Broadly, the application provides a sequence of user interfaces that lead a user/administrator through a series of well-defined steps (a "wizard"), which facilitates the user/administrator to configure various nodes in cloud 140.

Display area 310 indicates that the user interface of display area 300 corresponds to Step 2 (of a total number of 4 steps) of the wizard, namely, establishing a connection with a node in cloud 140. Display area 320 accordingly enables a user/administrator to specify the URL (uniform resource locator) of the node (assumed to be 130B) whose exposed objects are desired to be queried. It may be observed that the URL is of a web service provided by node 130B, indicating that a web service request is to be sent for obtaining the meta-data related to the objects exposed by node 130B. The user may click/select "Test Connection" button 325 to check whether a connection to the specified URL can be established, and thereafter click/select "Next" button 315 to proceed to the next step in the wizard.

In response to the user selecting the "Next" button 315, query builder 150 sends a web service request to the URL specified in display area 320. A sample web service request that may be sent is shown below:

```
<SOAP-ENV:Body>
    <ns3:GetMetaData/>
</SOAP-ENV:Body>
```

It may be appreciated that the above web service request invokes the service "GetMetaData", which is designed to send the meta-data according to XML (Extensible Markup Language) format as a response to the web service request. Sample portions of the meta-data received from a node (130B) are described in detail below.

FIG. 3B depicts portions of meta-data obtained from a node in one embodiment. Though shown in XML format, it may be appreciated that in alternative embodiments, the meta-data may be received (from node 130B) and/or maintained (in client system 110A) in other formats such as JSON (JavaScript Object Notation) and/or using other data structures such as tables, lists, trees, etc. as will be apparent to one skilled in the relevant arts by reading the disclosure herein.

Data portion 330 specifies the information on a single object/class exposed by node 130B (identified by the URL specified in display area 320). As is well known, XML data generally contains elements (typically containing corresponding start and end tags) and/or attributes set equal to corresponding desired data values to describe the data.

As such, data portion 350 (within data portion 330) specifies that the name of the single object is "Account" (element "n1:Name") in the namespace "objects.ws.rightnow.com/v1_2" and that the object is derived from the parent class named "RNObject" (element "n1:DerivedFrom"), etc. In one embodiment, the namespace is used to indicate whether an object/class is a custom object (when having the value "CO") or a standard object (when having any other value other than "CO").

Data portion 340 (within data portion 330) specifies a list of attributes of the single object (element "n1:Attributes"), along with the details of each attribute (element "n1: MetaDataAttributeList"). It may be observed that data portion 340 specifies the details of an attribute named "ID" (element "n1:Name" in the element "n1: MetaDataAttributeList") of the single object/class "Account". Similarly, other attributes of an object/class may be specified as part of the meta-data.

Data portion 360 (within data portion 330) specifies the details of the relationships (element "n1:Relationships") of the single object "Account" with other objects exposed by node 130B. In particular, data portion 360 indicates that the object "Account" has a relationship with the object named "Product_Registration" (which is a custom object as indicated by the namespace "CO") and the cardinality of the relationship is One-to-Many. Similarly, other relationships of an object/class with other objects may be specified as part of the meta-data.

Thus, data portion 330 specifies the various details of the object/class "Account". Other objects exposed by node 130B may be similarly specified (and received) as part of the meta-data obtained from node 130B, thereby enabling query builder 150 (the application noted above) to obtain the information on all the objects exposed by node 130B. Furthermore, since the meta-data is provided by the node (130B), the meta-data generally includes information on both standard and custom objects exposed by the node.

Query builder 150 may thereafter facilitate the building of a query based on the meta-data obtained from node 130B, as described below with examples.

5. Building a Query

Figure 4:
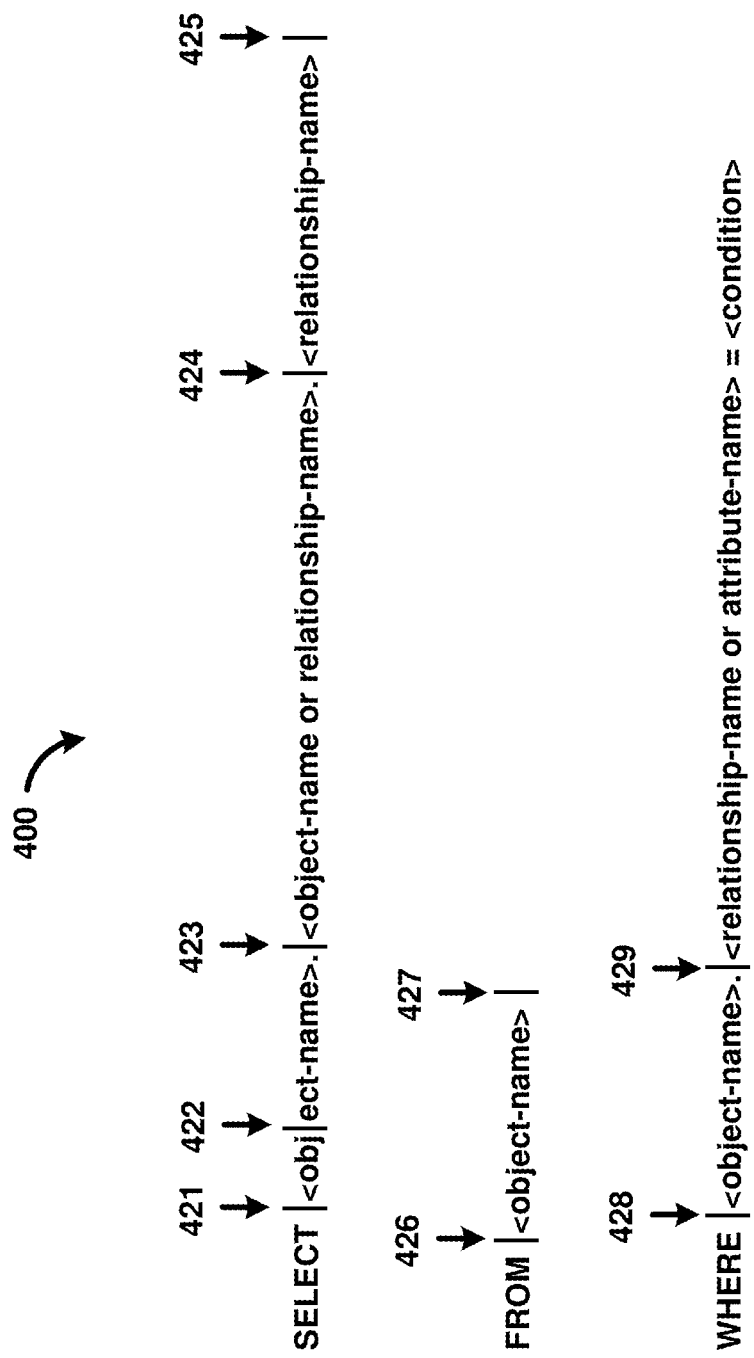
FIG. 4 illustrates the syntax of a query type and the manner in which a user is enabled to form a query of the query type in one embodiment.

FIG. 4 illustrates the syntax of a query type and the manner in which a user is enabled to form a query of the query type in one embodiment. In particular, query 400 illustrates the syntax of a SELECT query type according to ROQL noted above. The words shown in capitals such as "SELECT", "FROM", etc. are keywords according to ROQL, while the labels <object-name>, <relationship-name>, etc. are identifiers of the objects, relationships, etc. respectively. However, the features described below may be implemented during the forming queries of other query types such as "INSERT", "UPDATE", "DELETE", etc., according to other Object Query Languages (OQL), as will be apparent to one skilled in the relevant arts by reading the disclosure herein.

In one embodiment, a user enters a sequence of characters as part of query 400 in an input field provided by query builder 150. For the convenience of the user, a cursor (the vertical bar '|') indicating the current edit location (the point at which the next/new character typed by the user will be inserted) is displayed to the user. At any desired edit location, the user may perform a pre-defined action to indicate to query builder 150 that the user wishes to view potential candidates for insertion. The pre-defined action may be one or more of selecting an icon using a pointer device, entering a combination of keys (such as pressing both the "Ctrl" and "Space" keys at the same time), etc.

Each of points 421-429 accordingly represents a corresponding edit location at which a user indication has been received by query builder 150. It may be appreciated that at each point, the current edit location is indicated by the cursor and the sequence of characters already entered by the user up to the current edit location represents the partial query at that point. Thus, at point 421, the current edit location is indicated by the cursor and the partial query is "SELECT_" (where _ indicates a space character).

In response to receiving the user indication at point 421, query builder 150 determines based on the meta-data (shown in FIG. 3B), the current edit position and the partial query "SELECT_", a list of identifiers which are potential candidates for insertion at the current edit location. In particular, query builder 150 first determines that the potential candidates are identifiers of objects (as also indicated by <object-name> shown after the cursor) based on the partial query and current edit location.

Query builder 150 then searches the meta-data for the identifiers of (both standard and custom) objects and include such identifiers in the list. It may be appreciated that the meta-data obtained from a first node (e.g. 130B) in the cloud can be different from the meta-data obtained from a second node (e.g. 160A). As such, when the user indication is received for same partial query and same current edit location (such as point 421), the list of identifiers determined when connected to the first node can be different from the list of identifiers determined when connected to the second node. The difference in the list of identifiers is at least present when the list includes identifiers of custom objects (since custom objects are specific toe each node).

Query builder 150 than provides the list of identifiers of objects to the user (as described in detail in below sections). In response to the user selecting an identifier from the list, query builder 150 incorporates the selected identifier into the query at point 421. In other words, query builder 150 inserts the characters forming the selected identifier into the sequence of characters forming query 400 at that time instance.

Point 422 represents an edit location at which the user indication is received after the user has entered a beginning set of characters (e.g. "Se" for illustration). Accordingly, query builder 150 includes in the list only those identifiers of objects which start with the beginning set of characters ("Se") already entered by the user. Though shown with respect to the identifiers/names of the objects, it may be appreciated that such a feature may be provided with respect to identifiers of attributes, relationships, etc. as well, as will be apparent to one skilled in the relevant arts by reading the disclosure herein.

When a beginning set of characters is already entered (such as at point 422), the incorporation of a selected identifier may entail incorporating only the additional characters of the selected identifier (other than the beginning set) in the partial query. In the above example, as the user has already "Se" representing the beginning set, a selected identifier such as "ServiceCategory" is incorporated by adding the characters/text "rviceCategory" at the current edit location in the partial query.

Point 423 represents an edit location at which the user indication has been received after the user has entered a "." (dot character) after specifying an <object-name>. As is well known, the dot character is used in object notation to indicate that an attribute (which in turn may be an object) or a relationship specified as part of the specific object (identified by the <object-name>) is sought to be accessed. Since both an attribute and a relationship can be specified at point 423, query builder 150 includes the identifiers of both attributes and relationships of the specific object in the list displayed to the user. The specific object may be identified based on the <object-name> specified in the partial query at point 423. For example, if the <object-name> is specified as "Account" (as defined by data portion 330 of FIG. 3B), the names of the attributes specified in data portion 340 and the names of the relationships specified in data portion 360 are included in the list displayed at point 423.

It may be appreciated that a user may perform the operation at point 423 multiple times to create a chain of object and relationship names (such as, A.B.C.D), and finally at point 424 select the last object/relationship in the chain. The end of the chain may be indicated when the user enters a space character (instead of a dot character). At point 425, query builder 150 determines that the SELECT clause of the query is completed and may accordingly display a list of keywords (such as "FROM", "WHERE", etc. as specified by ROQL) that are potential candidates for insertion at point 425.

Similarly, query builder 150 may provide various lists of identifiers which are potential candidates for insertion at each of points 426-429. For example, points 426 and 427 may be processed similar to the respective processing of points 421 and 425 noted above, while the processing at points 428 and 429 is similar to the above noted processing at point 423. It should be noted that at point 428, the list of identifiers includes the identifiers of attributes and also the identifiers of the relationships of the object (identified by <object-name>), irrespective of whether the object is a standard object or a custom object.

Thus, query builder 150 facilitates/simplifies the building of queries directed to objects hosted on clouds (such as 140). Some sample user interfaces that may be provided by query builder 150 to a user for building queries are described below with examples.

6. Sample User Interfaces

Figure 5A:
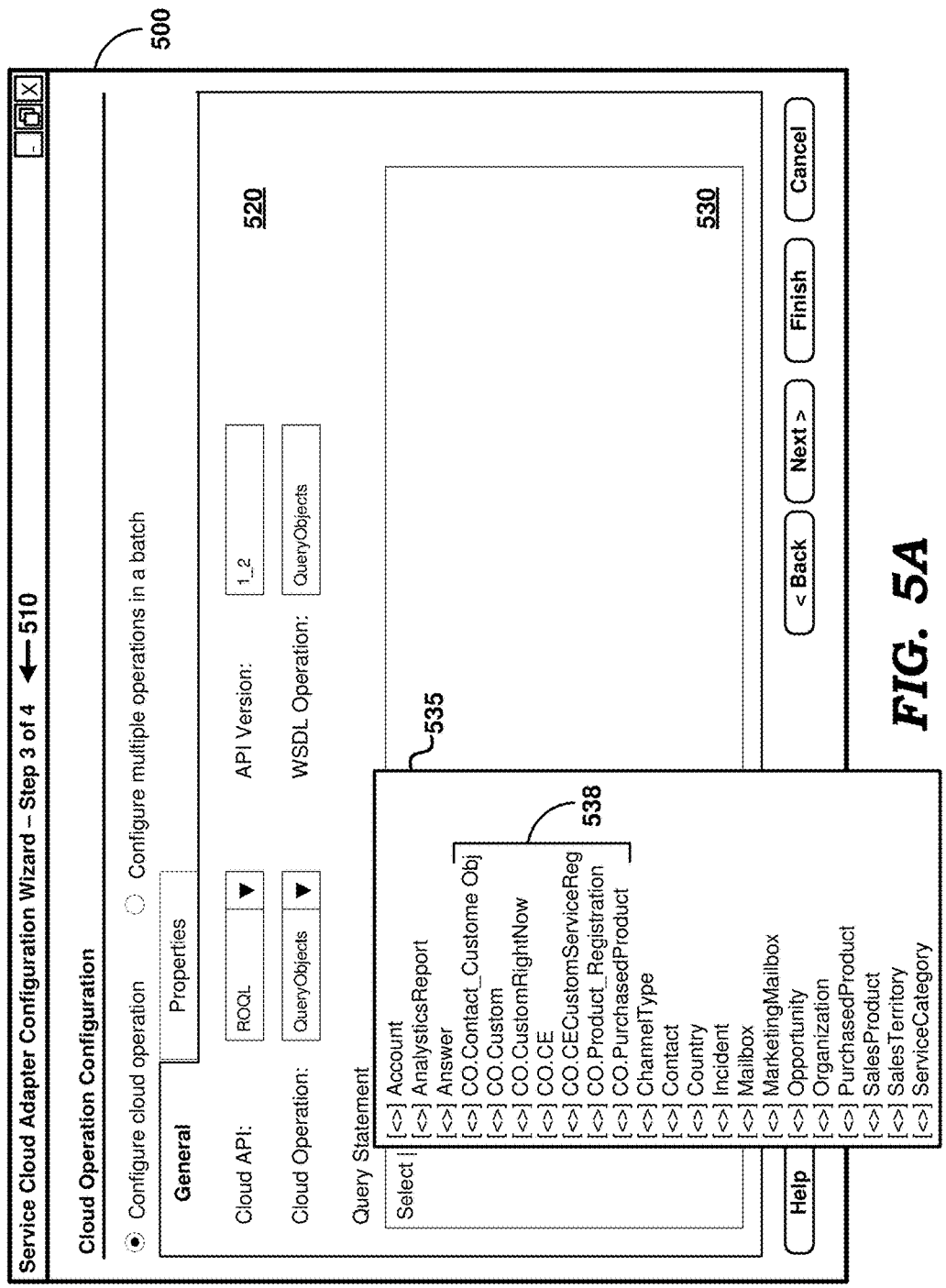
FIGS. 5A-5G depicts various user interfaces that may be provided for building queries directed to objects hosted on a cloud in one embodiment.
Figure 5B:
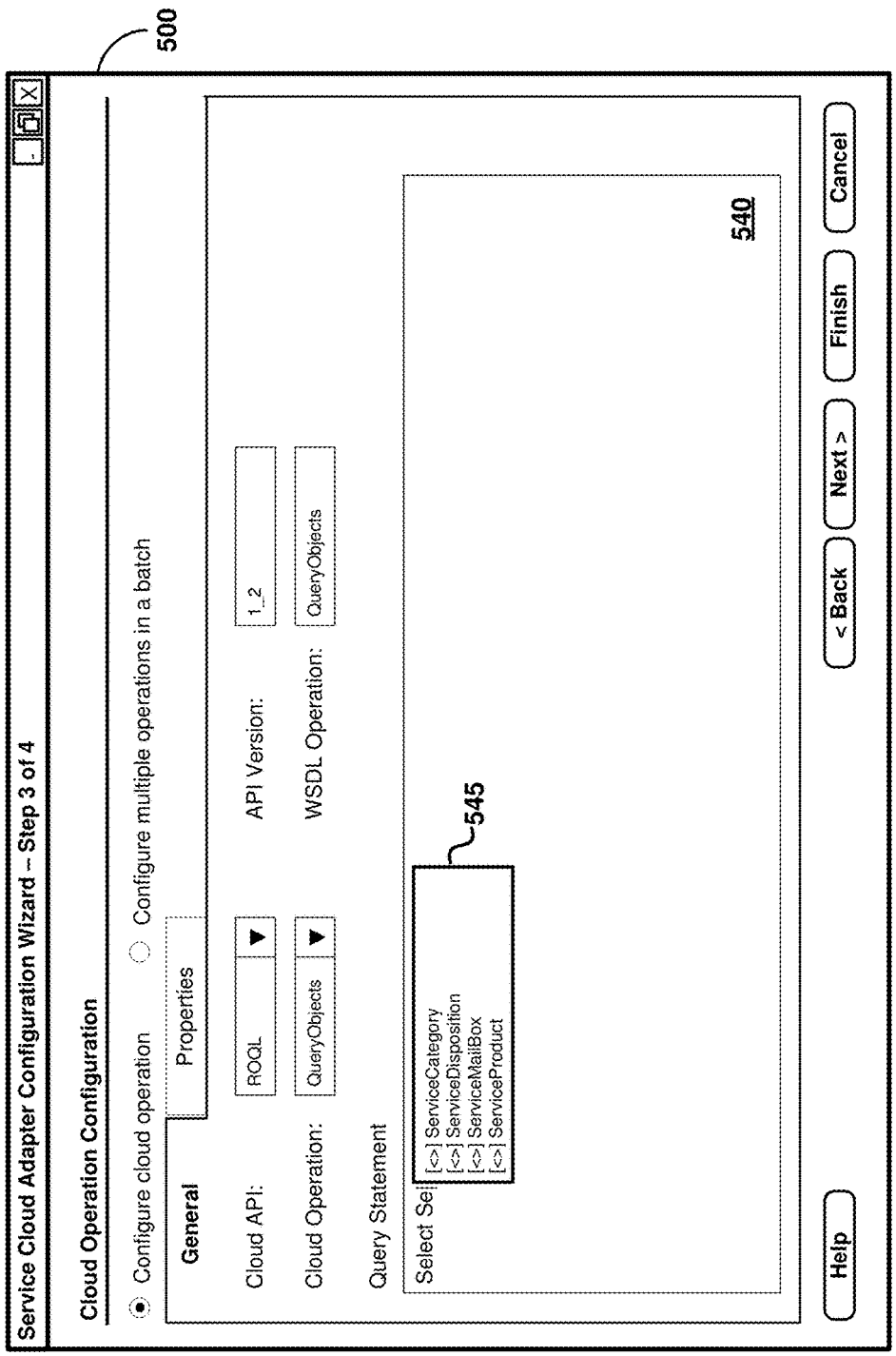
Figure 5C:
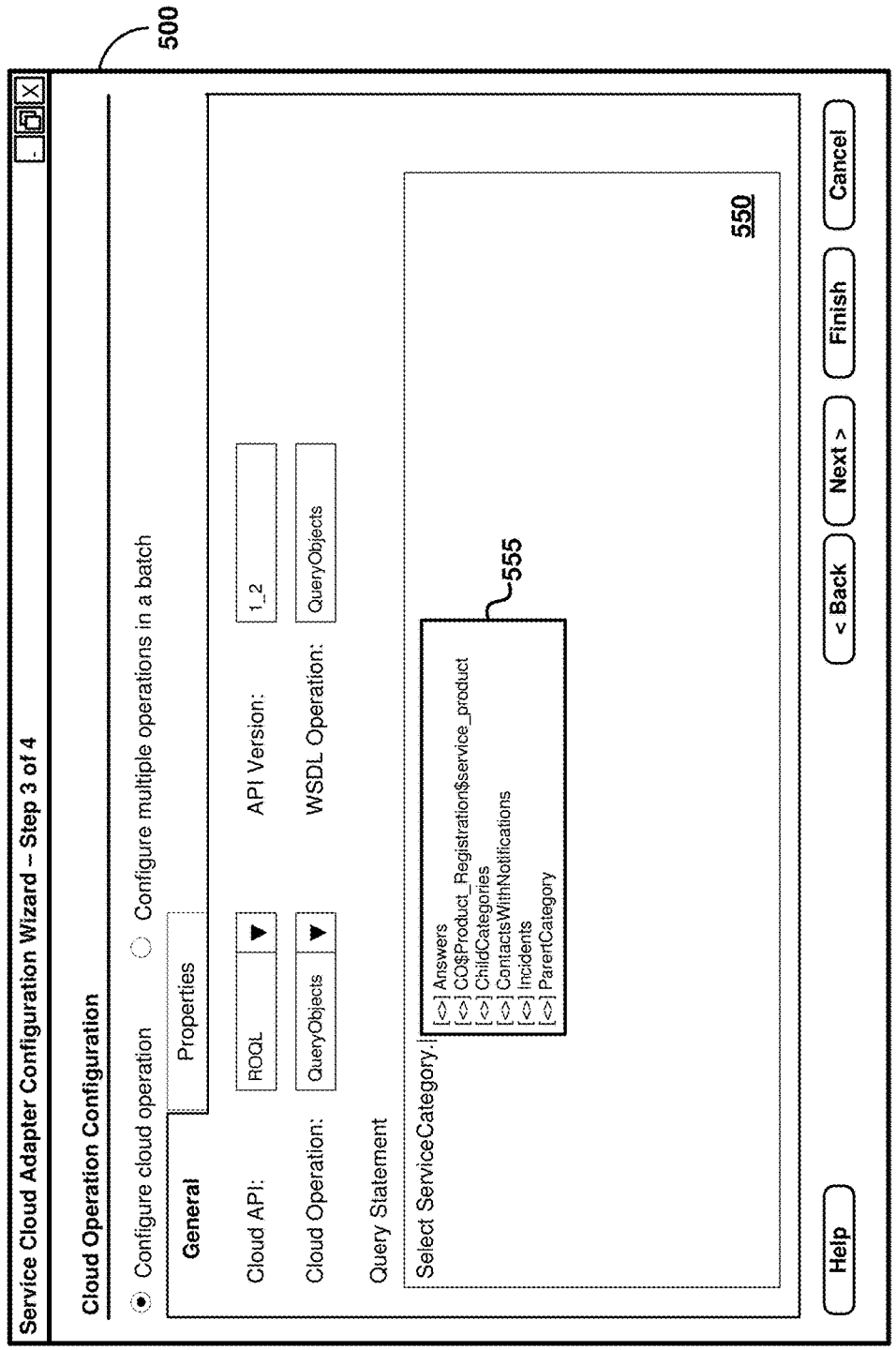
Figure 5D:
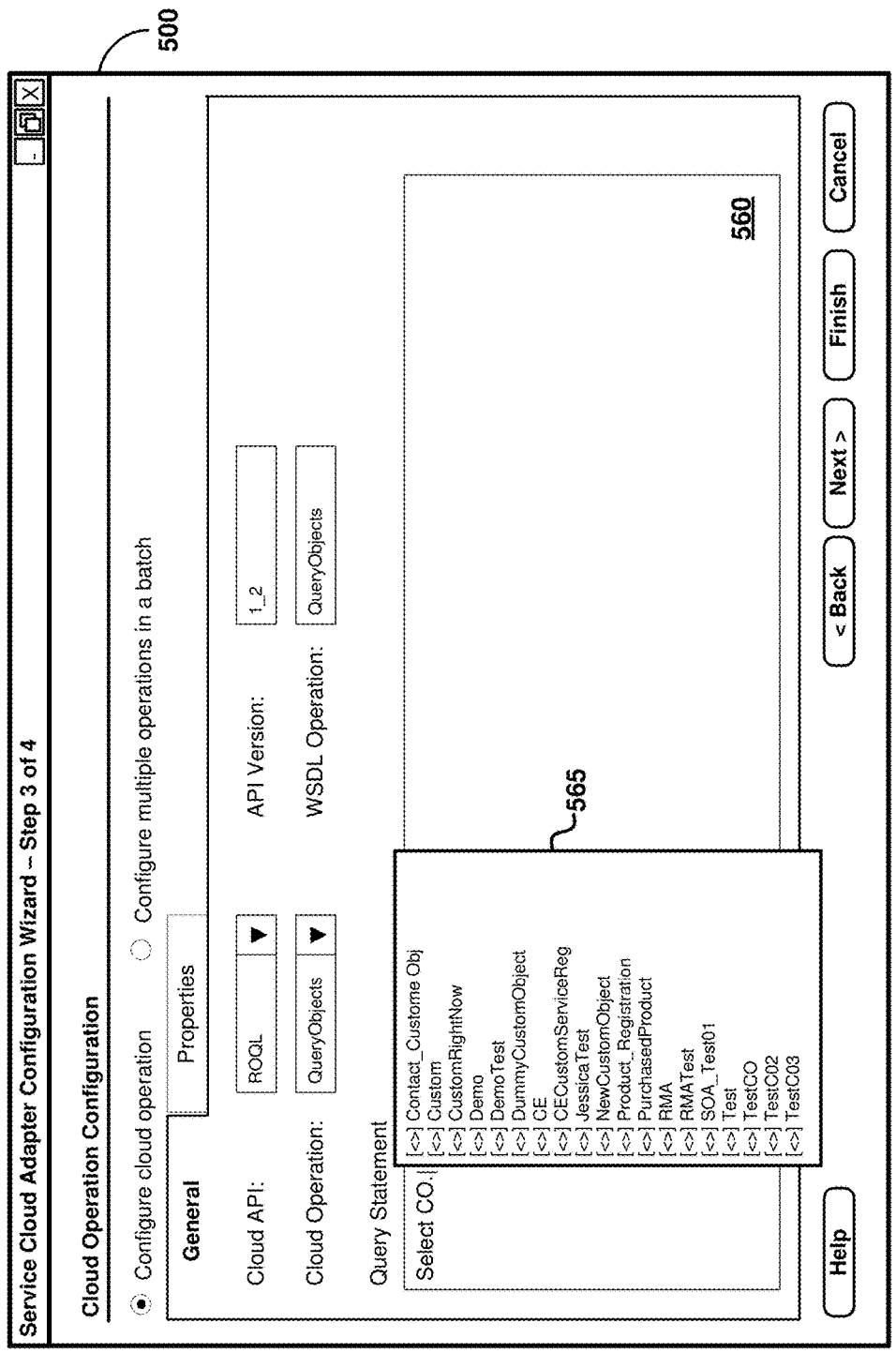
Figure 5E:
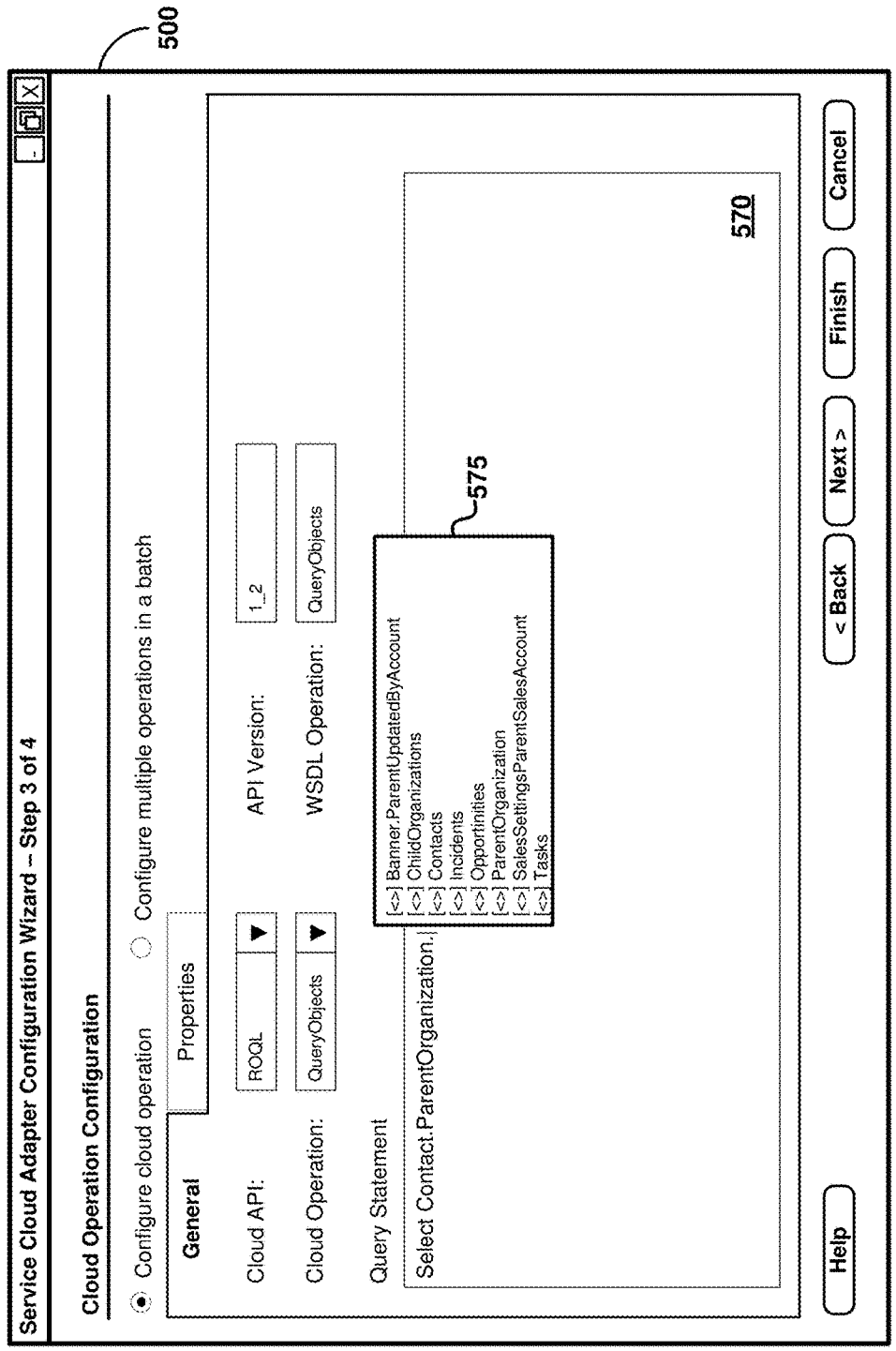
Figure 5F:
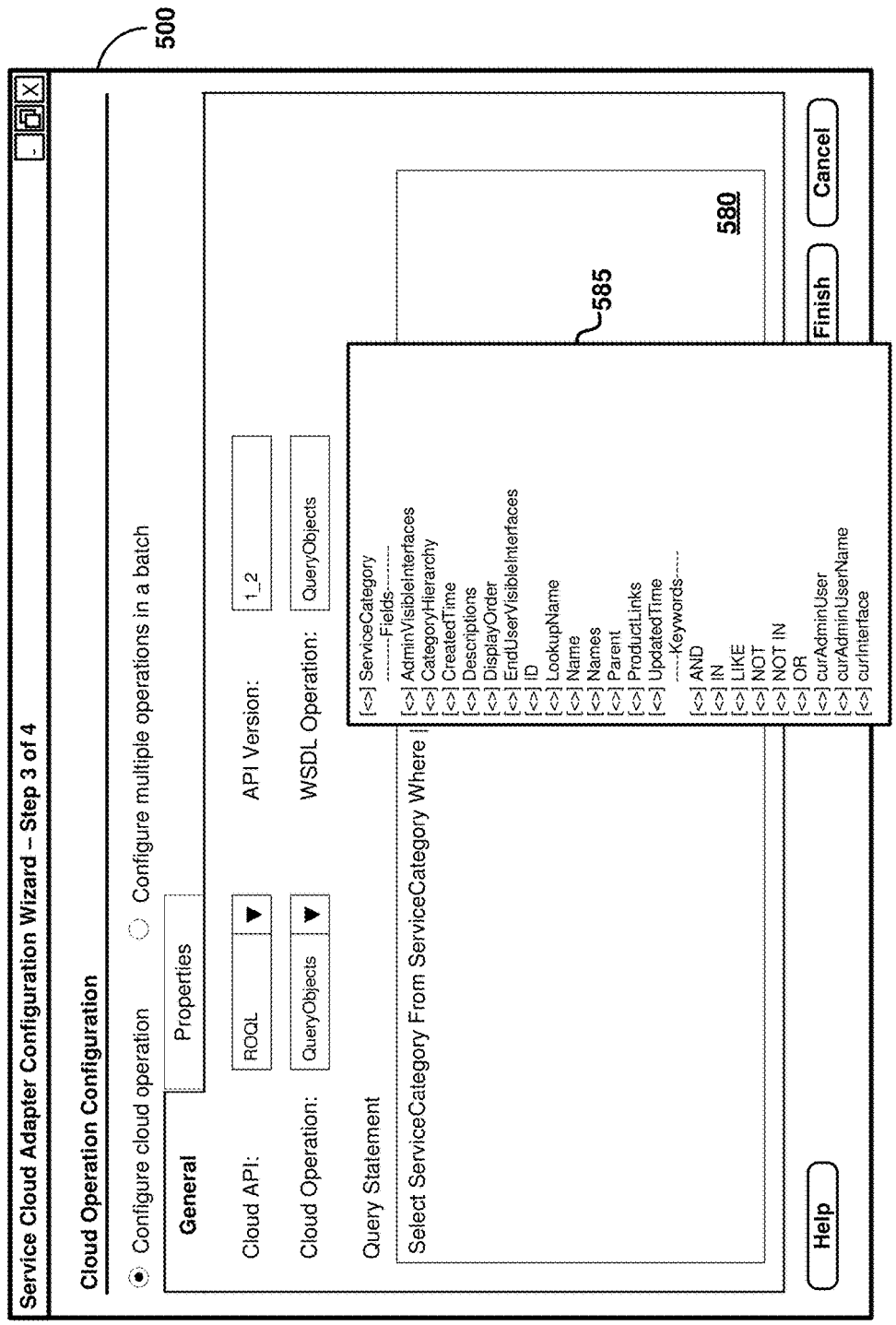
Figure 5G:
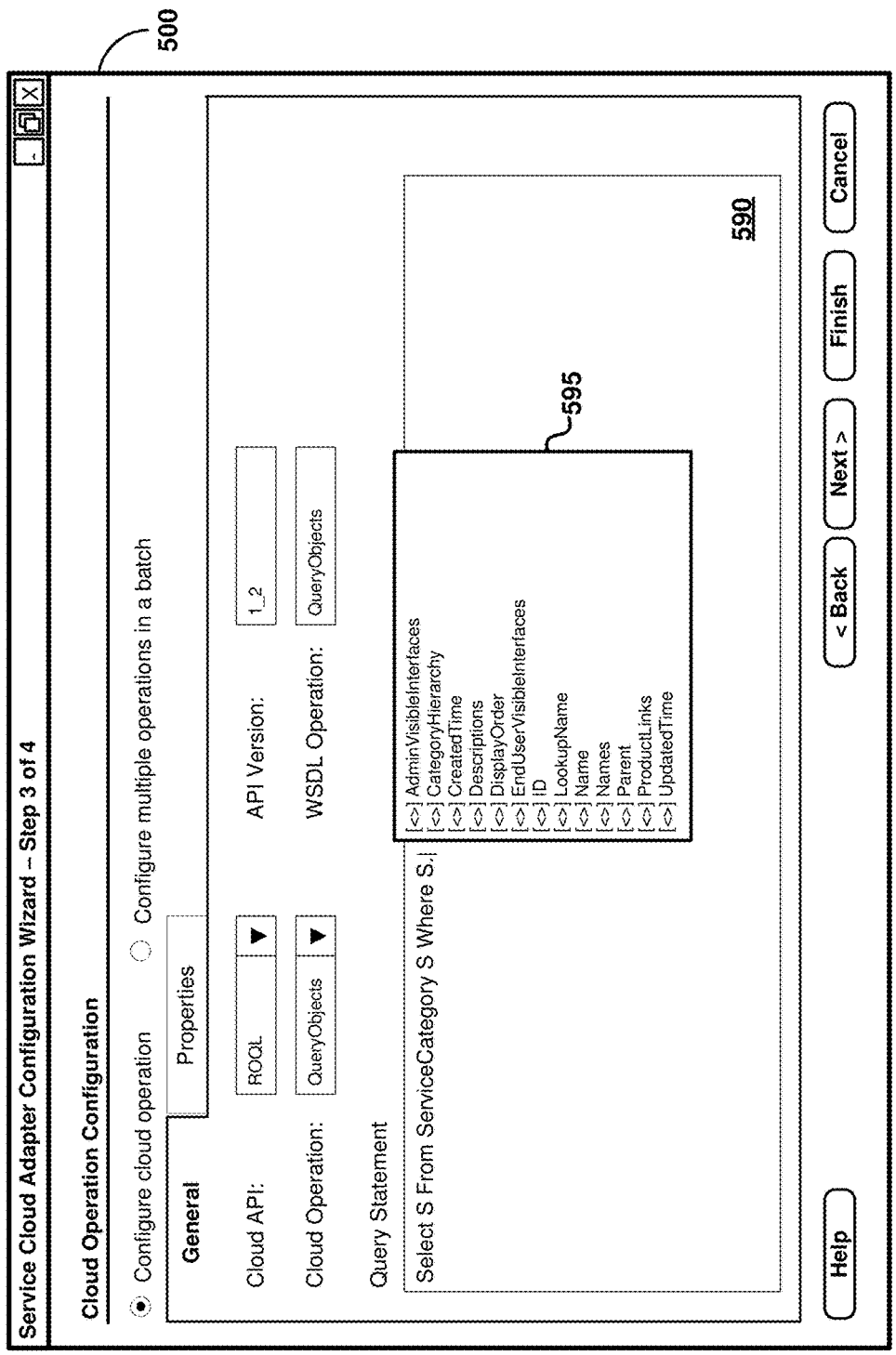
Figure 6A:
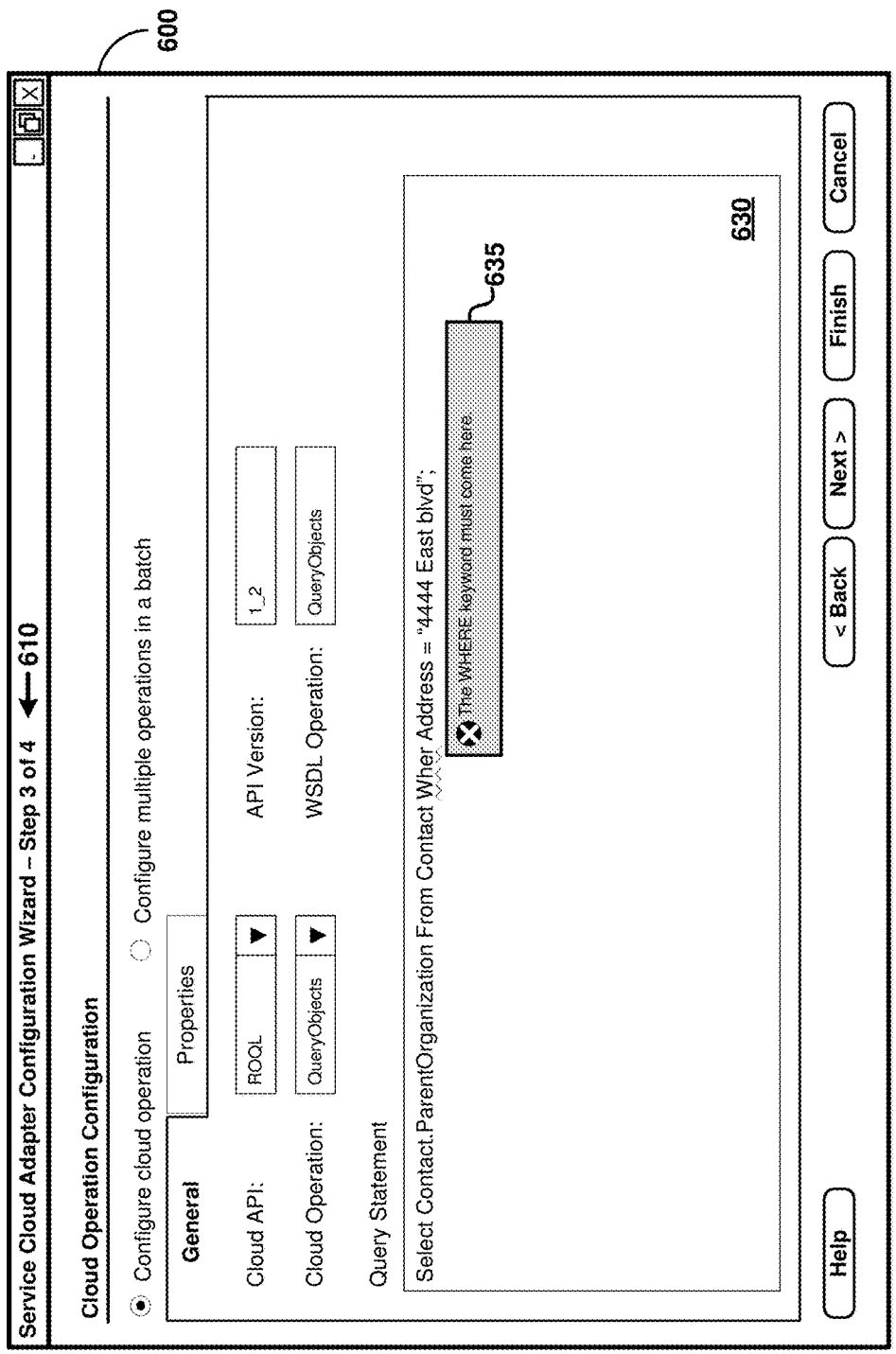
FIGS. 6A and 6B depicts the manner in which errors due to inline validation of a query is indicated in one embodiment.
Figure 6B:
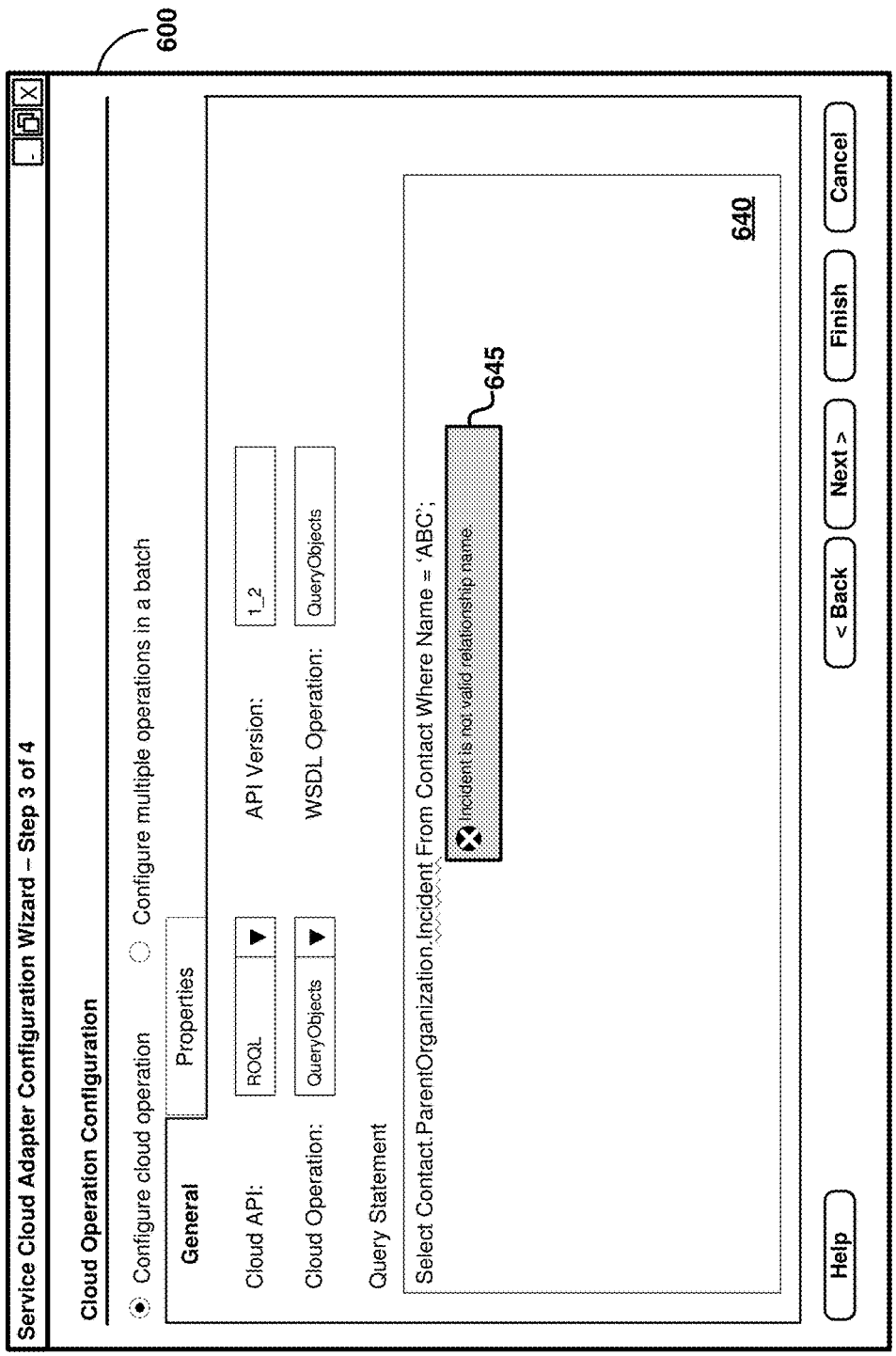

FIGS. 5A-5G and 6A-6B depicts various user interfaces that may be provided for building queries directed to objects hosted on a cloud (140) in one embodiment. As noted above, display area 500 of FIGS. 5A-5G and display area 600 of FIGS. 6A-6B depicts a portion of a user interface provided by query builder 150 as part of a wizard. Each of the Figures is described in detail below.

FIG. 5A depicts the manner in which a list of identifiers of objects is displayed to a user in response to the user indication being received at point 421 in one embodiment. Display area 510 of FIG. 5A and also display area 610 of FIG. 6A indicates that the user interface of display areas 500 and 600 both correspond to Step 3 (of a total number of 4 steps) of the wizard, namely, configuring a cloud operation to be performed on the node (130B) in cloud 140 to which a connection has been established (in step 2, described above with respect to FIG. 3A).

Display area 520 indicates that the cloud operation to be performed is to query objects and that the query is according to ROQL. Display area 530 (input field noted above) facilitates a user to specify a query statement according to ROQL, with a cursor (the vertical bar 'I') indicating the current edit location (the point at which the next/new character typed by the user will be inserted). It may be appreciated that the text (characters) entered in display area 530 represents the partial query specified by the user at a time instance of performing the user indication.

Display area 535 depicts a pop-up menu provided at the current edit location (point 421), thereby enabling the user to select (using a pointing device or a keyboard) one of the displayed identifiers (such as "Account, "Contact", etc.). It may be observed that the identifiers shown in display area 538 are prefixed with the text "CO." (the namespace) indicating that these objects are custom objects. The absence of such text (that is "CO") indicates that the identifier is of a standard object. Furthermore, though display area 535 is shown displayed at the current cursor position (indicated by the location of the vertical bar "|"), it may be appreciated that in alternative embodiments, display area 535 may be provided in any convenient form as part of display area 500.

FIG. 5B depicts the manner in which a list of identifiers of objects is displayed to a user in response to the user indication being received at point 422 in one embodiment. Display area 540 indicates the partial query at the time instance of receiving the user indication at point 422, while display area 545 depicts the pop-up menu provided in response to the user indication at point 422. It may be observed that the partial query in display area 540 indicates that the user indication was received after the user has specified "Se" as part of the object name, and accordingly only the identifiers of the objects that start with the beginning set of characters "Se" entered by the user are shown in the pop-up menu of display area 545.

FIG. 5C depicts the manner in which a list of identifiers of objects and relationships is displayed to a user in response to the user indication being received at point 423 in one embodiment. Display area 550 indicates the partial query at the time instance of receiving the user indication at point 423, while display area 555 depicts the pop-up menu provided in response to the user indication at point 423. It may be observed that the partial query in display area 550 indicates that the user indication was received after the user has specified "ServiceCateogy" as the object name, and accordingly only a list of objects and relationships of the (standard) object "ServiceCategory" are shown in the pop-up menu of display area 555.

It may be appreciated that the user may have formed the partial query of display area 550 by selecting the object "ServiceCategory" in the pop-up menu shown in display area 545 of FIG. 5B. In other words, the identifier selected from the list of identifiers shown in display area 545 is incorporated (in response to user selection) in the partial query of display area 540 to form a further developed query (partial query) shown in display area 550. The user may similarly select and incorporate other identifiers shown in corresponding pop-menus/lists in a sequence of iterations, with the further developed query of a current iteration being used as the partial query for a next iteration until the corresponding complete query is formed.

FIG. 5D depicts the manner in which a list of identifiers of objects and relationships is displayed to a user in response to the user indication being received at point 423 for a custom object in one embodiment. Display area 560 indicates the partial query at the time instance of receiving the user indication at point 423, while display area 565 depicts the pop-up menu provided in response to the user indication at point 423. It may be observed that the partial query in display area 540 indicates that the user indication was received after the user has specified "CO." as part of the namespace/object name, and accordingly only the identifiers of the custom objects are shown in the pop-up menu of display area 565.

As noted above, the set of custom objects exposed by a first node (e.g. 130B) in cloud 140 is different from the set of custom objected exposed by a second node (e.g. 160A) in cloud 140. As such, the list of identifiers displayed in the pop-up menu of display area 565 is dependent on the specific node to which the connection is established (using FIG. 3A) and from where the meta-data is obtained.

FIG. 5E depicts the manner in which a user is enabled to perform the operation of selecting identifier for multiple times at point 423 in one embodiment. Display area 570 indicates the partial query at the time instance of receiving the user indication at point 423, while display area 575 depicts the pop-up menu provided in response to the user indication at point 423. It may be observed that the partial query in display area 570 indicates that the user indication was received after the user has specified "Contact.ParentOrganization" as part of the query, and accordingly the identifiers of objects and relationships corresponding to the chain of objects/relationships "Contact.ParentOrganization" selected/entered earlier by the user are shown in the pop-up menu of display area 575.

FIG. 5F depicts the manner in which a list of identifiers of objects, attributes and also keywords is displayed to a user in response to a user indication being received as point 428 in one embodiment. Display area 580 indicates the partial query at the time instance of receiving the user indication at point 428, while display area 585 depicts the pop-up menu provided in response to the user indication at point 428. It may be observed that the pop-up menu of display area 585 includes identifiers of objects (such as "ServiceCategory"), identifiers of attributes/fields (such as "ID", "Name", "CreatedTime", etc.) and keywords (such as "AND", "LIKE", etc.).

FIG. 5G depicts the manner in which aliases to objects are supported in the building of queries in one embodiment. As is well known in query languages, an alias is an alternative (typically shorter) name used in place of an object name. Display area 590 indicates the partial query at the time instance of receiving a user indication at point 429. It may be observed that in display area 590, "S" is defined as the alias for the object name "ServiceCategory" (by the text "ServiceCategory S"), and accordingly "S" is used instead of "ServiceCategory" in the other portions of the query.

In one embodiment, query builder 150 determines the actual object name that is being represented by the alias, and determines the list of identifiers based on the actual object name. Display area 595 depicts the pop-up menu provided in response to the user indication at point 429. It may be observed that the list includes the identifiers of the attributes/fields of the "ServiceCategory" object, though the user has entered the text "S." (the alias defined in another portion of the query).

According to an aspect of the present disclosure, query builder 150 performs inline validations of the query as the user enters the query in the input field (for example, without using user indications). The inline validations may entail performing spelling checks on keywords, object names, relationship names, field names and names of functions. Furthermore, query builder 150 may also support for semantic validation of the query. For example, query builder 150 may recognize that the specified relationship or attribute name is invalid in the context of the currently selected object.

FIGS. 6A and 6B depicts the manner in which errors due to inline validation of a query is indicated in one embodiment. Referring to FIG. 6A, display area 630 depicts a query for which inline validation has been performed, with the erroneous portions of the query shown highlighted (by drawing a squiggly/wavy line underneath the erroneous portion). Display area 635 depicts a tool tip message (displayed when a user hovers over the erroneous portion/wavy line) indicating a suggestion on how the error could possibly be corrected. It may be observed that the message in display area 640 indicates a correct syntax of the query as a possible suggestion for the syntactic error. Referring to FIG. 6B, display area 640 depicts another query for which inline validation has been performed, an error identified (wrong relationship name), and the erroneous portion highlighted. Display area 645 depicts a tool tip message indicating the error, thereby enabling the user to correct the error (change to an valid relationship name). In one embodiment, the keywords that are typed correctly are shown in a color different from the normal text color to indicate that the keywords are valid.

It should be further appreciated that the features described above can be implemented in various embodiments as a desired combination of one or more of hardware, executable modules, and firmware. The description is continued with respect to an embodiment in which various features are operative when the instructions in the executable modules are executed.

7. Digital Processing System

Figure 7:
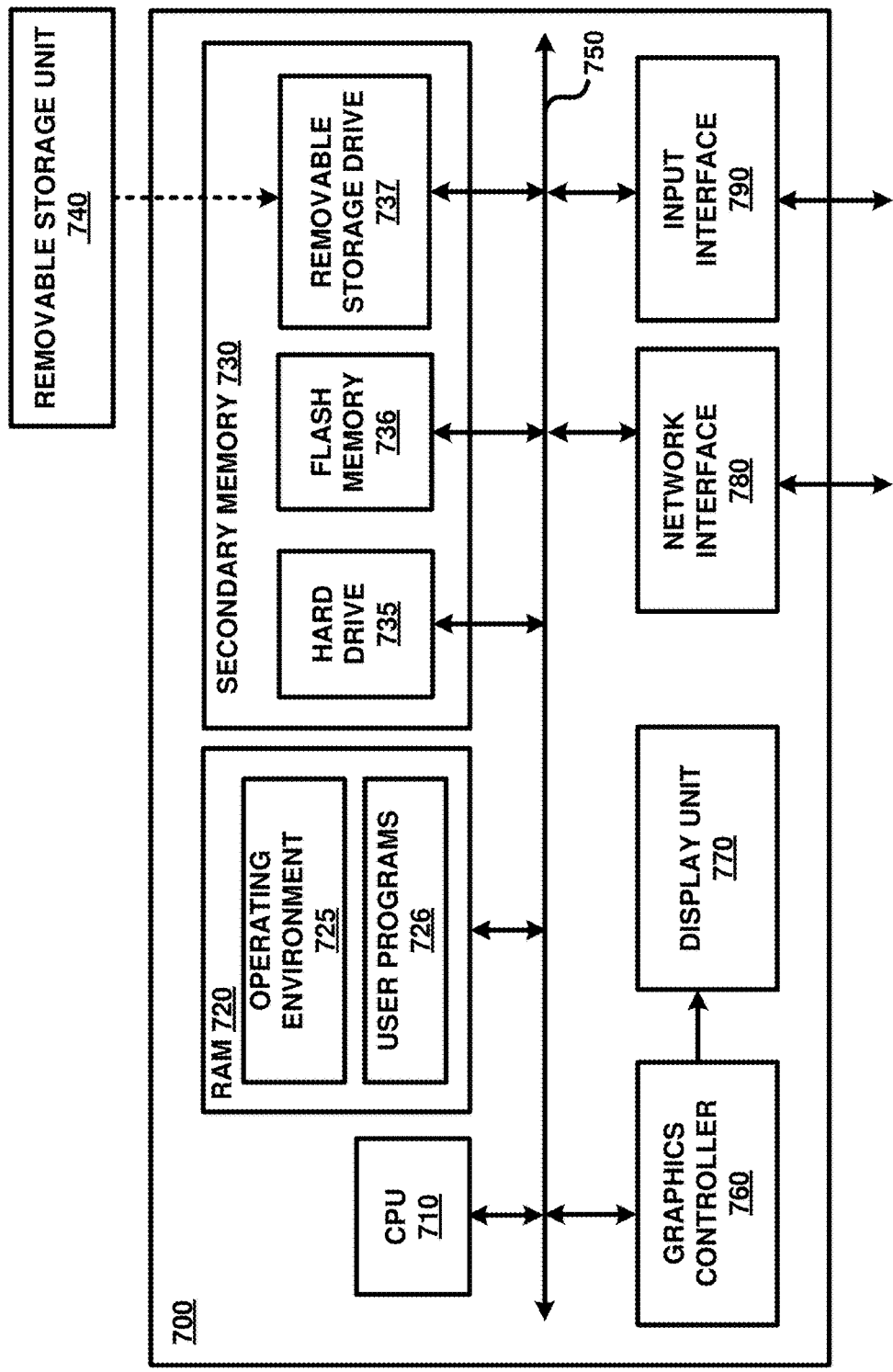
FIG. 7 is a block diagram illustrating the details of a digital processing system in which several aspects of the present disclosure are operative by execution of appropriate executable modules.

FIG. 7 is a block diagram illustrating the details of digital processing system 700 in which several aspects of the present disclosure are operative by execution of appropriate executable modules. Digital processing system 700 corresponds to any system (such as client system 110A) executing query builder 150.

Digital processing system 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit. RAM 720 may receive instructions from secondary memory 730 using communication path 750. RAM 720 is shown currently containing software instructions constituting shared environment 725 and/or user programs 726 (such as browsers, database clients, etc.). Shared environment 725 contains utilities shared by user programs, and such shared utilities include operating system, device drivers, virtual machines, flow engines, etc., which provide a (common) run time environment for execution of user programs 726.

Graphics controller 760 generates display signals (e.g., in RGB format) to display unit 770 based on data/instructions received from CPU 710. Display unit 770 contains a display screen to display the images defined by the display signals (such as the portions of the user interface of FIGS. 3A, 5A-5G and 6A-6B). Input interface 790 may correspond to a keyboard and a pointing device (e.g., touch-pad, mouse) that may be used to provide various inputs (such as to specify the desired inputs, etc. in the user interfaces of FIGS. 3A, 5A-5G and 6A-6B). Network interface 780 provides connectivity to a network (e.g., using Internet Protocol), and may be used to communicate with other connected systems (such as the various nodes in cloud 140).

Secondary memory 730 represents a non-transitory medium, which may store the data (for example, portions of data shown in FIGS. 3B and 4) and software instructions (for example, for performing the steps of FIG. 2), to enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Secondary memory 730 may contain hard drive 735, flash memory 736, and removable storage drive 737. Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of facilitating building of queries directed to objects hosted on various nodes provided in a cloud, said method being implemented in a client system, said method comprising:

receiving, in said client system, from a user a first locator of a first node exposing objects based on which a complete query is to be built and thereafter executed, said first locator specifying an address at which said first node is accessible, said first node being contained in a plurality of nodes in said cloud;

after receiving of said first locator, sending over a network from said client system to said first node in said cloud, a first request for meta-data related to objects;

receiving, in said client system, from said first node a first meta-data specifying information related to objects exposed by said first node, wherein said first meta-data is received in response to said sending of said first request, wherein said first meta-data comprises a plurality of identifiers, wherein each identifier is associated with a corresponding type of a plurality of types, said plurality of types comprising an object, an attribute of an object, and a relationship of an object with another object;

receiving, in said client system, from said user a partial query and a current edit location during building of said complete query;

determining, in said client system, a list of identifiers of said plurality of identifiers which are potential candidates for insertion at said current edit location, wherein said determining comprises identifying based on a syntax of said queries and said current edit location a suitable type of said plurality of types, wherein said list of identifiers comprise said plurality of identifiers associated with said suitable type;

sending for display said list of identifiers;

receiving, in said client system, selection of a first identifier of said list of identifiers; and incorporating said first identifier in said partial query at said current edit location to form a further developed query as a part of said complete query, wherein said complete query is directed to objects exposed by said first node and therefore suitable for execution on said first node, whereby said user can generate queries directed to different nodes of interest provided in said cloud by specifying the corresponding address at which the corresponding node is accessible.

2. The method of claim 1, wherein said receiving from said user, said determining, said sending for display, said receiving selection and said incorporating are performed in a sequence of iterations, wherein said further developed query of a current iteration of said sequence of iterations is used as said partial query for a next iteration of said sequence of iteration until said complete query is formed, said method further comprising executing said complete query on said first node in said cloud.

3. The method of claim 2, further comprising:

receiving from said user a second locator of a second node exposing objects based on which a second complete query is to be built and thereafter executed, said second node being contained in said plurality of nodes;

after receiving of said first locator, sending to said second node in said cloud, a second request for meta-data related to objects;

receiving from said second node a second meta-data specifying information related to objects exposed by said second node, wherein said second meta-data comprises a second plurality of identifiers, wherein each identifier is associated with a corresponding type of said plurality of types;

receive from said user a second partial query and a second current edit location during building of said second complete query;

determining a second list of identifiers of said second plurality of identifiers that are potential candidates for insertion at said second current edit location, wherein said second list of identifiers is different from said list of identifiers in view of said second meta-data being different from said first meta-data, even when said second partial query and said second current edit location is respectively identical to said partial query and said current edit location.

4. The method of claim 3, wherein said first meta-data and said second meta-data includes custom objects exposed only by said first node and said second node respectively, thereby causing said first meta-data to be different from said second meta-data.

5. The method of claim 4, wherein said list of identifiers is displayed as a pop-up menu at said current edit location.

6. The method of claim 5, wherein said corresponding complete query is according to Object Query Language (OQL).

7. A non-transitory machine readable medium storing one or more sequences of instructions for enabling a client system to facilitate building of queries directed to objects hosted on a cloud, wherein execution of said one or more instructions by one or more processors contained in said client system enables said client system to perform the actions of:

sending from said client system to a first node in said cloud, a first request for meta-data related to objects;

receiving in said client system, from said first node a first meta-data specifying information related to objects exposed by said first node, wherein said first meta-data comprises a plurality of identifiers, wherein said first meta-data is received in response to said sending of said first request, wherein each identifier is associated with a corresponding type of a plurality of types, said plurality of types comprising an object, an attribute of an object, and a relationship of an object with another object;

receiving, in said client system, from a user a partial query and a current edit location during building of a corresponding complete query;

determining, in said client system, a list of identifiers of said plurality of identifiers which are potential candidates for insertion at said current edit location, wherein said determining comprises identifying based on a syntax of said queries and said current edit location a suitable type of said plurality of types, wherein said list of identifiers comprise said plurality of identifiers associated with said suitable type;

sending for display said list of identifiers;

receiving, in said client system, selection of a first identifier of said list of identifiers; and incorporating said first identifier in said partial query at said current edit location to form a further developed query, wherein said complete query is directed to objects exposed by said first node and therefore suitable for execution on said first node, whereby said user can generate queries directed to different nodes of interest provided in said cloud by specifying the corresponding address at which the corresponding node is accessible.

8. The non-transitory machine readable medium of claim 7, wherein said receiving from said user, said determining, said sending for display, said receiving selection and said incorporating are performed in a sequence of iterations, wherein said further developed query of a current iteration of said sequence of iterations is used as said partial query for a next iteration of said sequence of iteration until said corresponding complete query is formed, further comprising one or more instructions for executing said corresponding complete query on said first node in said cloud.

9. The non-transitory machine readable medium of claim 8, further comprising one or more instructions for:

sending to a second node in said cloud, a second request for meta-data related to objects;

receiving from said second node a second meta-data specifying information related to objects exposed by said second node, wherein said second meta-data comprises a second plurality of identifiers, wherein each identifier is associated with a corresponding type of said plurality of types;

receive from said user a second partial query and a second current edit location during building of a corresponding second complete query;

determining a second list of identifiers of said second plurality of identifiers that are potential candidates for insertion at said second current edit location, wherein said second list of identifiers is different from said list of identifiers in view of said second meta-data being different from said first meta-data, even when said second partial query and said second current edit location is respectively identical to said partial query and said current edit location.

10. The non-transitory machine readable medium of claim 9, wherein said first meta-data and said second meta-data includes custom objects exposed only by said first node and said second node respectively, thereby causing said first meta-data to be different from said second meta-data.

11. The non-transitory machine readable medium of claim 10, wherein said list of identifiers is displayed as a pop-up menu at said current edit location.

12. The non-transitory machine readable medium of claim 11, wherein said corresponding complete query is according to Object Query Language (OQL).

13. A computing system comprising:

a plurality of nodes forming a cloud;

a client system comprising at least one processor and a memory, said client system performing the actions of:

receiving from a user a first locator of a first node exposing objects based on which a complete query is to be built and thereafter executed, said first locator specifying an address at which said first node is accessible, said first node being contained in a plurality of nodes in said cloud;

after receiving of said first locator, sending to a first node in said cloud, a first request for meta-data related to objects;

receiving from said first node a first meta-data specifying information related to objects exposed by said first node, wherein said first meta-data is received in response to said sending of said first request, wherein said first meta-data comprises a plurality of identifiers, wherein each identifier is associated with a corresponding type of a plurality of types, said plurality of types comprising an object, an attribute of an object, and a relationship of an object with another object;

receiving from a user a partial query and a current edit location during building of a corresponding complete query;

determining a list of identifiers of said plurality of identifiers which are potential candidates for insertion at said current edit location, wherein said determining comprises identifying based on a syntax of said queries and said current edit location a suitable type of said plurality of types, wherein said list of identifiers comprise said plurality of identifiers associated with said suitable type;

sending for display said list of identifiers;

receiving selection of a first identifier of said list of identifiers; and incorporating said first identifier in said partial query at said current edit location to form a further developed query, wherein said complete query is directed to objects exposed by said first node and therefore suitable for execution on said first node, whereby said user can generate queries directed to different nodes of interest provided in said cloud by specifying the corresponding address at which the corresponding node is accessible.

14. The computing system of claim 13, wherein said receiving from said user, said determining, said sending for display, said receiving selection and said incorporating are performed by said client system in a sequence of iterations, wherein said further developed query of a current iteration of said sequence of iterations is used as said partial query for a next iteration of said sequence of iteration until said corresponding complete query is formed, said client system further performing the actions of executing said corresponding complete query on said first node in said cloud.

15. The computing system of claim 14, said client system further performing the actions of:

sending to a second node in said cloud, a second request for meta-data related to objects;

receiving from said second node a second meta-data specifying information related to objects exposed by said second node, wherein said second meta-data comprises a second plurality of identifiers, wherein each identifier is associated with a corresponding type of said plurality of types;

receive from said user a second partial query and a second current edit location during building of a corresponding second complete query;

determining a second list of identifiers of said second plurality of identifiers that are potential candidates for insertion at said second current edit location, wherein said second list of identifiers is different from said list of identifiers in view of said second meta-data being different from said first meta-data, even when said second partial query and said second current edit location is respectively identical to said partial query and said current edit location.

16. The computing system of claim 15, wherein said first meta-data and said second meta-data includes custom objects exposed only by said first node and said second node respectively, thereby causing said first meta-data to be different from said second meta-data.

17. The computing system of claim 16, wherein said list of identifiers is displayed as a pop-up menu at said current edit location.

18. The method of claim 1, wherein said determining determines based on said syntax that said partial query includes a beginning set of characters prior to said current edit location, wherein said list of identifiers comprise said plurality of identifiers associated with said suitable type and starting with said beginning set of characters, wherein said incorporating incorporates the sequence of characters of said first identifier following said beginning set of characters at said current location.

19. The non-transitory machine readable medium of claim 7, wherein said determining determines based on said syntax that said partial query includes a beginning set of characters prior to said current edit location, wherein said list of identifiers comprise said plurality of identifiers associated with said suitable type and starting with said beginning set of characters, wherein said incorporating incorporates the sequence of characters of said first identifier following said beginning set of characters at said current location.

20. The computing system of claim 13, wherein said determining determines based on said syntax that said partial query includes a beginning set of characters prior to said current edit location, wherein said list of identifiers comprise said plurality of identifiers associated with said suitable type and starting with said beginning set of characters, wherein said incorporating incorporates the sequence of characters of said first identifier following said beginning set of characters at said current location.

\* \* \* \* \*